June 10, 1930.  A. G. BRADFORD  1,762,809
DIAL TELEPHONE ATTACHMENT
Filed Jan. 13, 1930
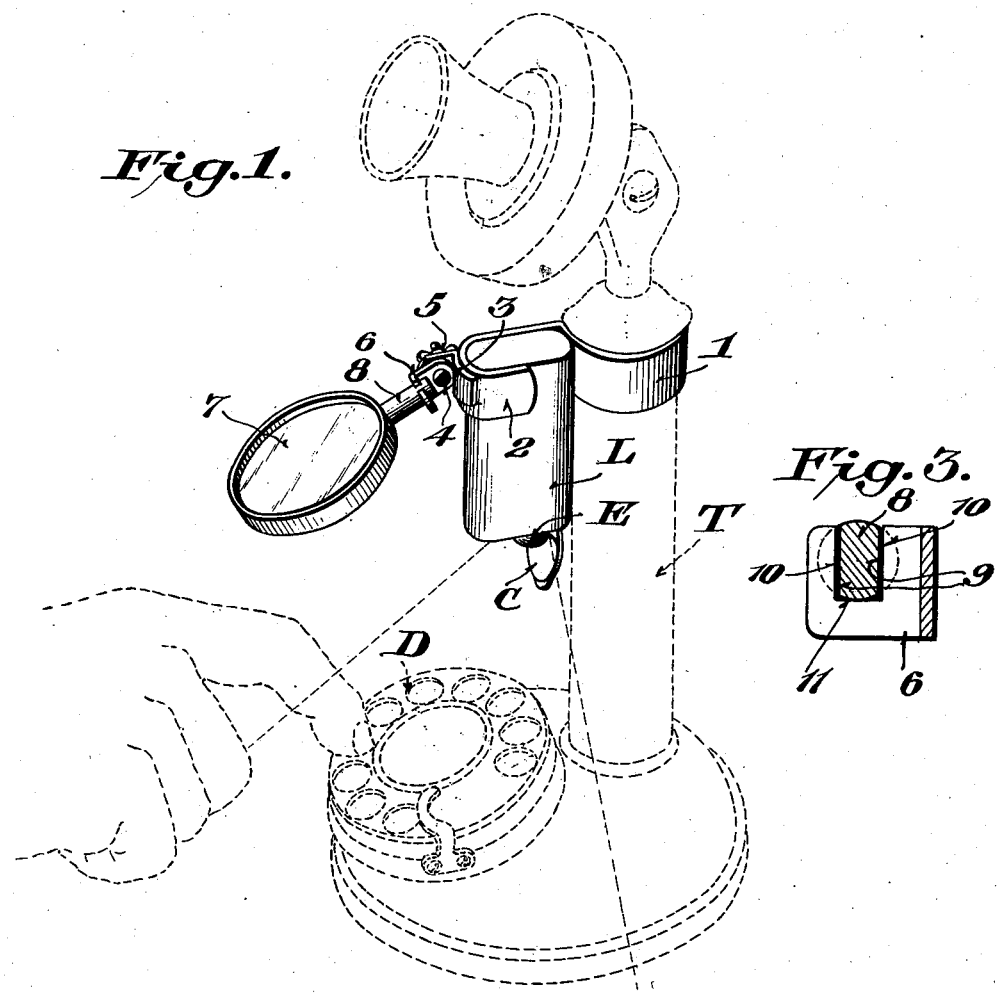
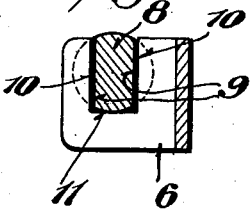
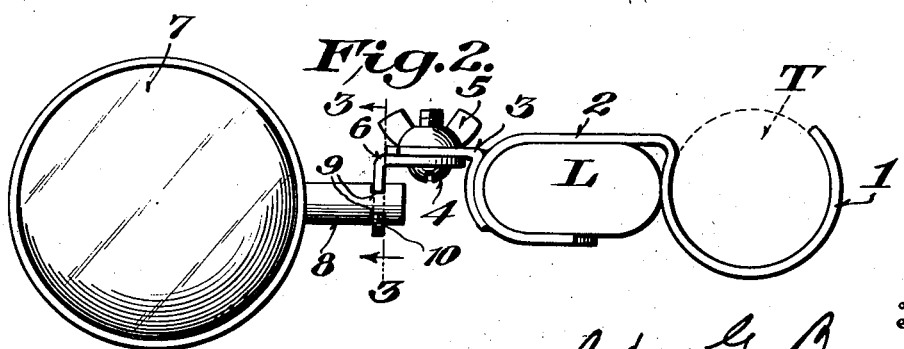
Inventor
Ada G. Bradford
By
Attorney Patented June 10, 1930

1,762,809

UNITED STATES PATENT OFFICE

ADA G. BRADFORD, OF OAKLAND, CALIFORNIA

DIAL-TELEPHONE ATTACHMENT

Application filed January 13, 1930. Serial No. 420,457.

This invention relates to a dial telephone attachment, and the primary object thereof is to provide an attachment which carries a magnifying glass and also a flash light, so as to illuminate the dial and to facilitate operation thereof.

A further object of the invention is to provide an attachment of this type which is of simple and economical construction, and one which involves a minimum of material; and has a minimum of parts that are compactly assembled, so as to occupy small space and at the same time to not interfere with free operation of the dial.

Further, the invention aims to provide a magnifying glass which can be easily removed for use in locating telephone numbers, or as a reading glass or otherwise, and which can be easily and quickly applied to the attachment.

The invention has still further and other objects which will be later set forth in the course of the following description.

In the drawings:

Fig. 1 is a perspective view of the invention showing same applied to a telephone, the latter being illustrated in dotted lines;

Fig. 2 is a top plan view of the invention; and

Fig. 3 is a section on line 3—3 of Fig. 2.

In proceeding in accordance with the present invention a bracket is provided which is composed of a strip of metal having one end bent to form a spring jaw 1, the latter shaped to engage about the telephone post or column T. The opposite end of the metal strip is bent to provide a substantially J-shaped jaw 2, the latter being adapted to grip a flash light L.

Referring to Fig. 1 of the drawings it will be noted that the flash light is held closely adjacent to the telephone column and at a distance above the dial D, the flash light having the usual lamp E at its bottom and a cover C, the cover when open completing the circuit through the lamp E and also acting as a reflector to direct the rays from the lamp onto the dial. A substantially L-shaped clip 3 is welded or otherwise secured to the outer side of the J-shaped jaw 2 and is perforated to receive a bolt 4 having a wing nut 5 thereon, the bolt 4 extending through one end of a substantially L-shaped magnifying glass support 6, the opposite end of which support or holder has a slot 11 extending through its upper edge. The frame of a magnifying glass 7 is provided with a handle 8 which latter is formed with a pair of opposed parallel slots 9, which slots receive the side edges or walls 10 resultant from the formation of the slot 11, in the holder 6, whereby it will be seen that the magnifying glass is not only held firmly in position and against turning movement, but also may be easily and quickly removed from and applied to the holder as desired.

By virtue of the adjustable clamping of the glass holder 6 to the jaw 2 by means of the nut and bolt, it will be seen that the glass may be adjusted as desired to properly focus same relative to the dial. It will further be apparent that the clamp 1 may be readily turned about the telephone column in focusing the glass, and that the entire attachment may be easily and quickly removed from the telephone column. It will further be noted that the flash light may be easily and quickly removed and a new one applied upon the battery becoming exhausted by merely moving the flash light downwardly out of the jaw 3.

From the foregoing it will be apparent that the bracket may be made of a single piece of spring material, and that the entire structure provides a simple, compact, economical and neat appearing one, with all of the parts closely related and occupying a minimum of space.

As shown in Figs. 1 and 2 the jaw 2 acts to hold the battery against one side of the jaw 1, thus not only affording a compact structure, but also one which more effectively and firmly holds the flash light L in position.

Obviously the magnifying glass and its holding means may be omitted if desired.

What is claimed is:

A dial telephone attachment composed of a bracket having a resilient substantially circular telephone column engaging jaw and a flash light engaging jaw connected thereto and located substantially diametrically thereof, the flash light engaging jaw having a part located opposite to a part of the telephone column engaging jaw and having a free end which extends toward and substantially confronts the adjacent side of the curved jaw, there being free space between said parts of the jaws, so as to hold the flash light directly against said part of the telephone column engaging jaw and vertically in close relation to the telephone column and to brace said part of the telephone column engaging jaw.

In testimony whereof I affix my signature.

ADA G. BRADFORD.